Fig. 5.

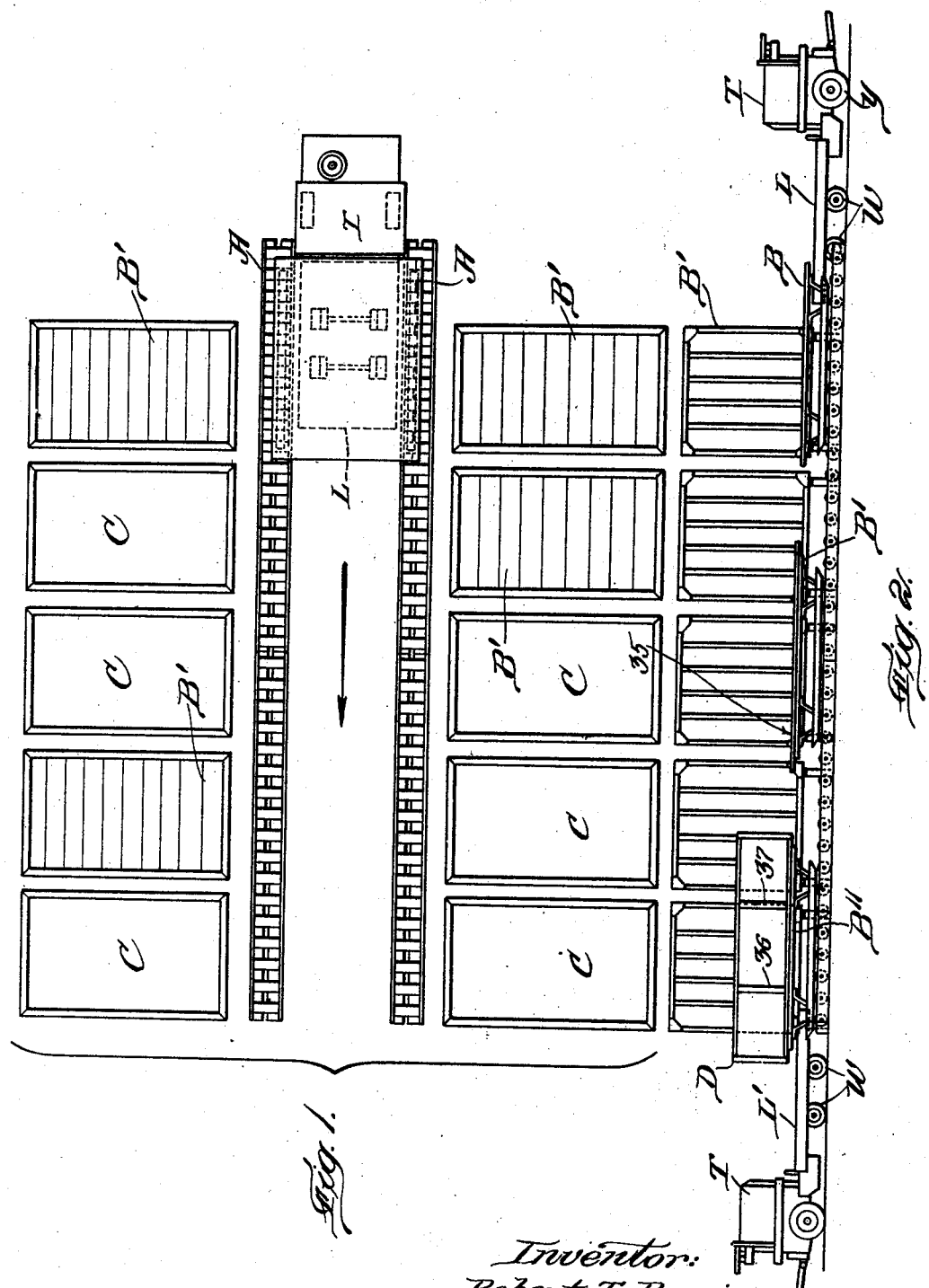

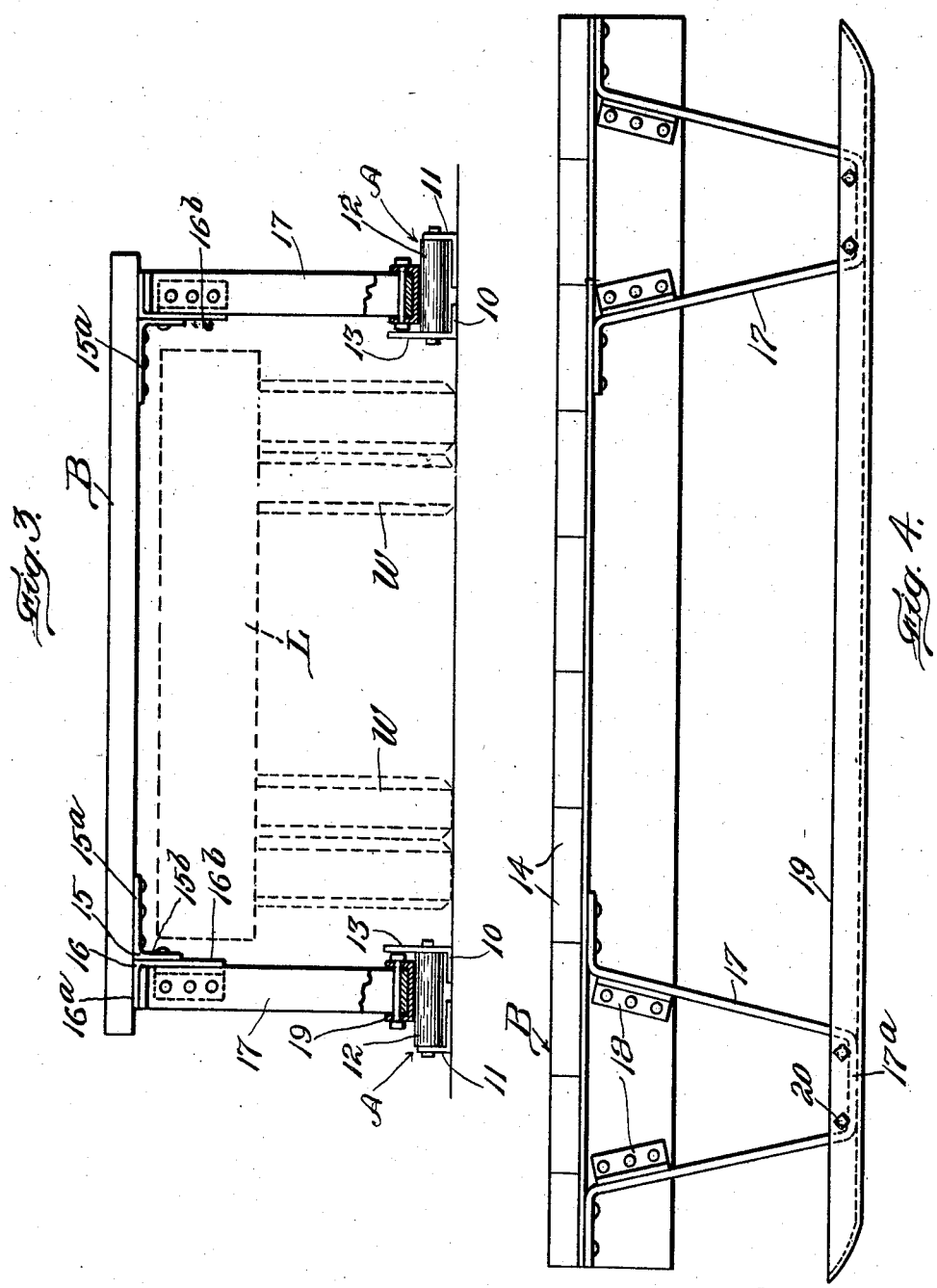

Aug. 11, 1931.  R. T. ROMINE  1,818,358
CONVEYER METHOD AND APPARATUS
Filed July 3, 1926    4 Sheets-Sheet 4
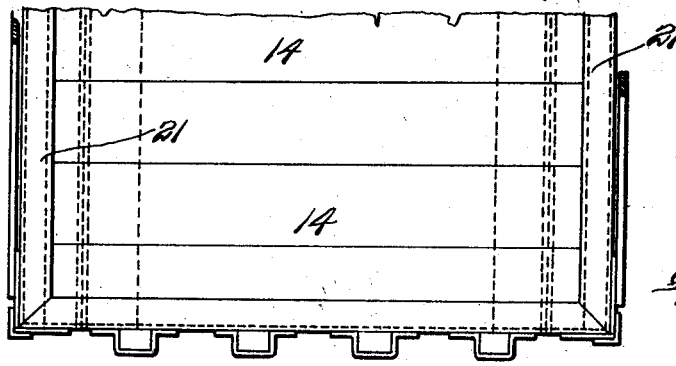
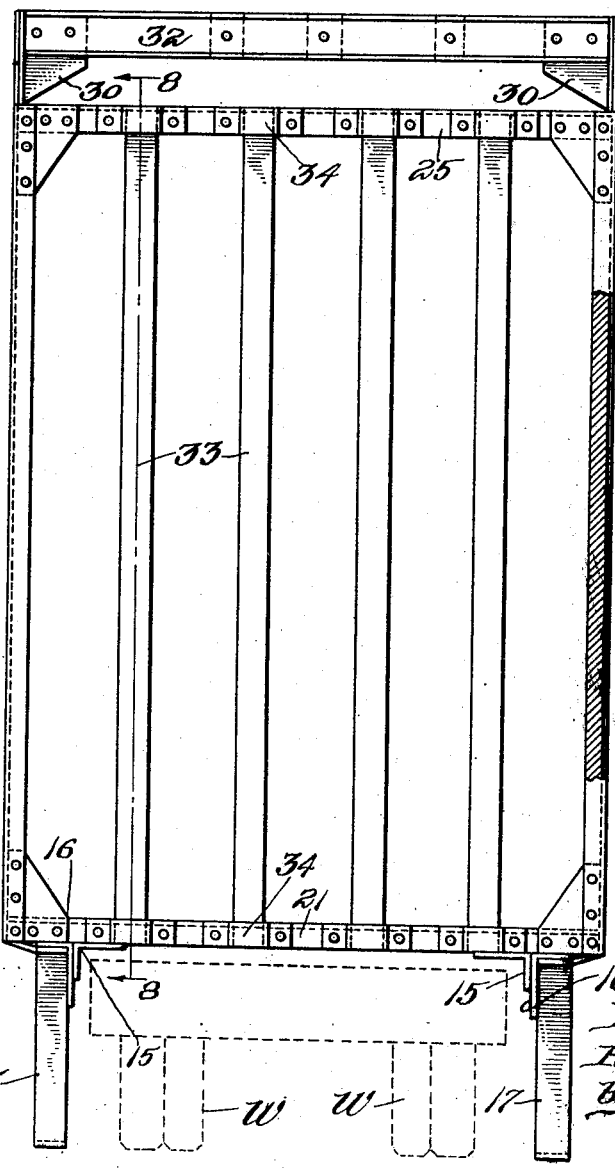
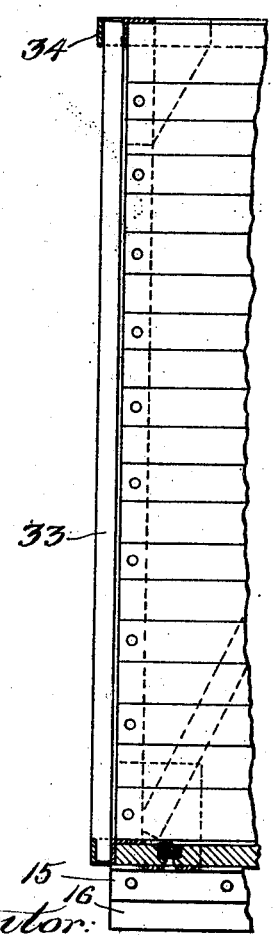
Inventor:
Robert T. Romine,
by
Macleod, Calver, Copeland & Dike
Attys.

Patented Aug. 11, 1931

1,818,358

UNITED STATES PATENT OFFICE

ROBERT T. ROMINE, OF MOUNT CLEMENS, MICHIGAN

CONVEYER METHOD AND APPARATUS

Application filed July 3, 1926. Serial No. 120,303.

This invention relates to a method, and an apparatus for carrying out the method, for conveying materials from place to place, and in the present instance for illustrative purposes the invention is shown as adapted for the purpose of progressively assembling or packing material, parts, articles, etc. into heavy or bulk load units or packages in a manner to enable more efficient and rapid handling of the material as well as the units. The invention is capable of use or adaptation in various industries, such for instance as in the automobile industry for assembling automobiles or parts thereof, or for packing automobile parts for shipment in unassembled condition.

One object of the present invention is to provide a method of assembling various kinds of material or articles on a series of independent traveling supports or platforms, and at the end of its travel picking up each support with its load and transporting it to a predetermined destination.

Another object of the invention is to provide a method of assembling material, stock or parts on a traveling support while at the same time packing such material, or constructing a container or box in which the material is being packed, and after completion thereof picking up the support with its load and transferring it to a predetermined place.

Another object is to provide an improved method of conveying material from point to point, or assembling material, on independent successively moving supports which may be separately handled, as a result of which the method does not require the employment of permanent endless belt conveyers which are expensive to install and operate, occupy a great deal of room, and are inflexible to changing needs or requirements in production or manufacture.

A further object of the invention is to provide a portable conveyer apparatus in which successive platforms or supports are caused to travel independently by means of an antifriction conveying surface or the like in a predetermined path or direction from one point to another, to transfer material, stock, etc., in which each platform may be initially deposited at the beginning of its travel by means of a lift truck, and removed at the end of its travel by a similar truck and hauled away. The present improved conveyer apparatus comprises a pair of spaced conveyer ways or runs which may be constructed of strips or sections of gravity rolls or other antifriction or conveying medium, adapted to be readily laid in sections on the factory floor at any desired location, and upon which ways are caused to travel successive platforms which are preferably deposited at one end of the apparatus by a lift truck and removed at the opposite end by a similar lift truck. Such an apparatus has a maximum degree of flexibility as well as being relatively simple and inexpensive in the cost of construction and installation. The platforms, forming the traveling surfaces of the conveyer, may be used for storage purposes after the material or other parts have been assembled on the platform, or may be used for other purposes in and about the plant. The conveyer ways may be easily lengthened by adding on sections of gravity roll or the like, or may be shortened as desired, or may be moved or transferred to different locations in the plant merely by picking up the conveyer ways and laying them again at other points in the plant.

Other objects of this invention will appear in the following description and appended claims, reference being had to the accompanying drawings forming a part of this specification, wherein like reference characters designate corresponding parts in the several views.

Figs. 1 and 2 are diagrammatical plan and side views illustrating the present method.

Fig. 3 is an end elevation illustrating the antifriction ways and the manner in which the portable platform is deposited on these ways by the electric truck.

Fig. 4 is a side elevation of the portable platform.

Figure 5:
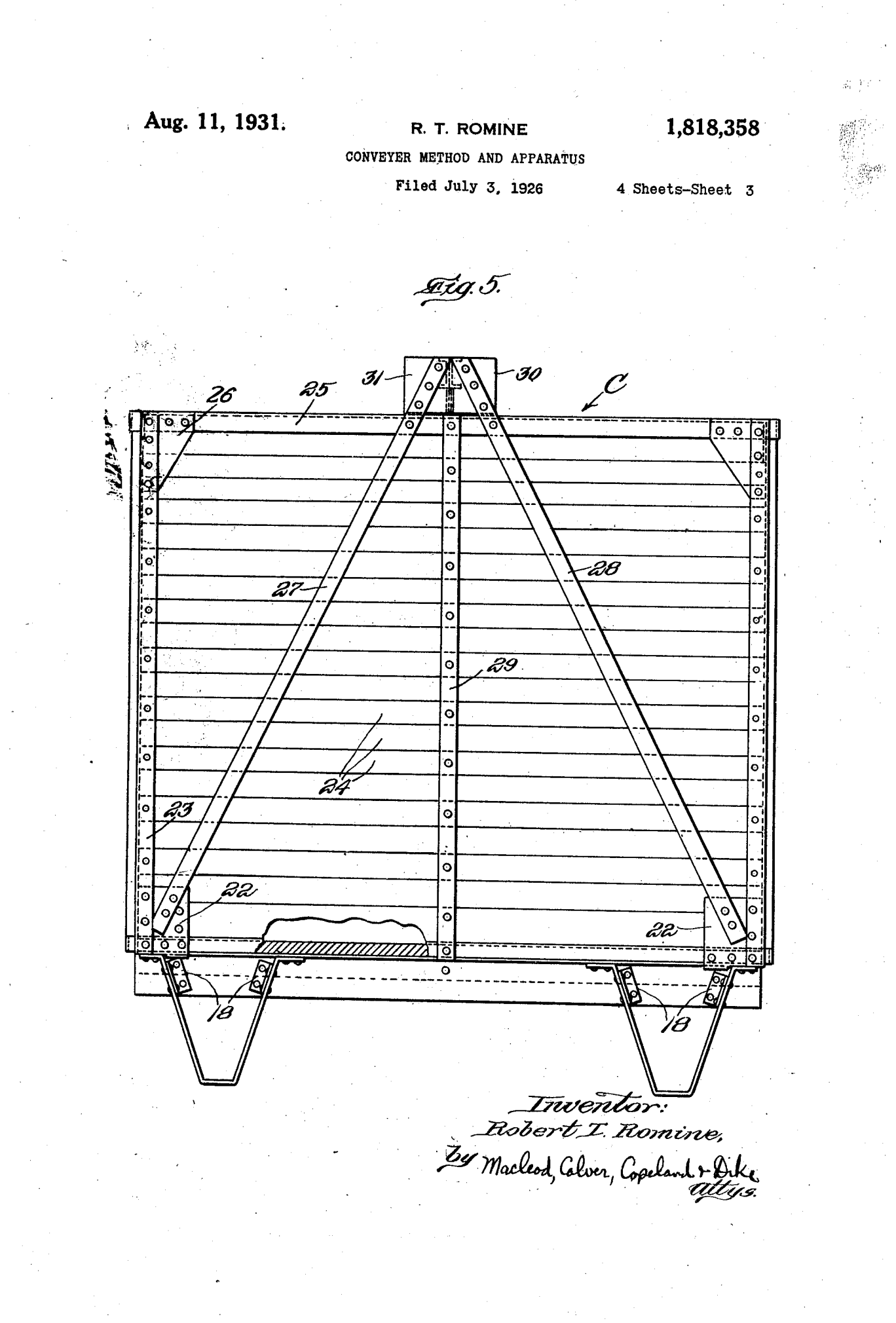

Fig. 5 is a side elevation showing one type of container or rack for holding the material or parts to be assembled on the conveyer platforms.

Fig. 6 is an end elevation of the container or rack shown in Fig. 5.

Fig. 7 is a fragmentary plan view thereof.

Fig. 8 is a sectional view taken substantially on lines 8—8, Fig. 6.

Before explaining in detail the present invention, and the method or mode of operation embodied therein, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended or the requirements of the prior art.

As illustrated in the drawings a pair of parallel conveyer runs or ways A are laid on the floor of the plant or building in spaced relation, each way comprising a number of portable sections placed end to end and joined at A' in any suitable manner. The ways A may be of any length desired, and the entire length of the conveyer may vary depending on requirements and the number of sections used, and may include curved sections to permit changes in direction of travel of the portable platforms. In the present instance each of the conveyer or antifriction ways A comprises sections or strips of gravity or antifriction rolls, and these may be held in position on the floor of the building as by means of a suitable number of blocks nailed to the floor at opposite sides of each section.

A series of portable platforms B are adapted to travel successively over the ways A, which platforms may be propelled or caused to travel over the conveyer surfaces as close together as desired and at such speed of travel depending upon the particular production requirements of the plant or industry.

Each portable platform is constructed so as to permit the load elevating platform L or L' of a lift truck T to be propelled or introduced beneath the platform in order to pick up the platform and transfer it from place to place. Each portable platform in the present instance comprises a platform top constructed from a series of cross boards 14. Extending along each longitudinal side of the platform top beneath the boards is a truss which in the present instance comprises a pair of angle bars 15 and 16 positioned back to back. The inner angle bar 15 of each truss has an inwardly extending horizontal flange 15a bearing against the bottom of the boards 14 and extending into position to overlie the truck platform L or L' so as to receive and distribute the upward thrust thereof. The outer angle bar 16 of each truss has a vertical flange 16b abutting against the vertical flange 15b of the inner angle 15. A pair of legs 17 are mounted against the outer face of each vertical flange 16b. Each of these legs may comprise a steel bar bent into substantially V-shape to form a flat bearing surface or foot 17a and upwardly extending diverging sides which are riveted at the upper bent ends thereof to the flange 16a of each outer angle bar. The sides of each leg are secured by rivets to the abutting flanges 16b and 15b by means of angle plates 18.

Each pair of legs 17 at each side of the platform are connected together at the lower ends thereof by means of a runner 19, which in the present instance may comprise a channel bar into which the feet 17a of the legs are fitted. The channel 19 is detachably clamped to the legs by means of bolts and nuts 20.

As illustrated in Fig. 2 the conveyer ways extend in parallel relation and each in the present instance comprises sections of gravity roll strips connected end to end. Each section comprises a pair of angles 10 and 11 positioned to form a channel. Journalled between the vertical flanges of the angles 10 and 11 are a series of spaced antifriction rolls 12 which are preferably free to rotate. In some instances certain of these rolls may be driven by power so as to form a positive means for propelling the platform over the ways. The construction of these strips of gravity rolls is such however that a very slight pressure is necessary to propel or move the platform over the ways, and even with heavy loads as much as ten tons carried on the platform. The bottom surfaces of the runners 19, secured to the legs of the portable platform, travel without substantial friction over the rollers 12, and the platform is guided and maintained in proper position on the antifriction ways by means of guide flanges 13 carried by the inner angles 10 and in position to cooperate with the runners 19 so as to maintain the platforms in alignment.

Where the apparatus is employed for the purpose of progressively assembling or depositing material on the platforms during their travel, or for packing articles in packing boxes or containers, the material is preferably placed along each side of the conveyer. In accordance with the present method the material, articles, or other parts to be assembled or deposited on the platforms B is carried to the assembly line in racks or containers C by means of a lift truck T and deposited at the proper point along opposite sides of the assembly line. The material in accordance with this method is brought to the assembly line either in a rack or container C, such as shown in Figures 5 to 8 inclusive, or on platforms B such as shown in Figures 3 and 4, in which case the runners 19 may be dispensed with if desired. These platforms or racks, which carry the material or parts to the assembly line or conveyer, are all handled by means of a lift truck T and none of the material is therefore stacked on the floor at the assembly line so as to require any manual handling to load or unload.

Referring to Figures 5 to 8 inclusive the container or rack shown comprises in the present instance a floor or platform top formed from a series of cross boards 14, similar to the construction shown in Figures 3 and 4. As in the case of the portable platform B each portable rack C is provided with a pair of lengthwise extending abutting angle bars 15 and 16 extending beneath the floor of the rack at each longitudinal side thereof, and connected to these are supports or legs 17 as previously described. The boards 14 of the platform may be bound around the edges by means of a rectangular frame comprising angle bars 21. Mounted at each corner of the floor or platform 14 of the rack are a pair of gusset plates 22 riveted to the angle iron frame 21, and to each pair of gusset plates as well as to the frame 21 is riveted a corner post 23 in the form of an angle bar. The rack is enclosed at opposite longitudinal sides by means of boards 24 positioned one above the other and secured to the angle iron corner posts 23. These posts are connected together by means of four angle bars 25 at the top of the rack, through the medium of gusset plates 26. A brace bar 29 at each side of the rack connects the upper longitudinal bars 25 with the side members of the angle iron frame 21.

A pair of brace bars 27 and 28 are secured at the lower ends thereof to the gusset plates 22 at each side of the rack, these bars extending upwardly in converging relation and the pairs are connected at the upper ends thereof by means of a transverse bail by means of which the rack or container may be lifted by a crane. Riveted to the upper converging ends of each pair of bars 27 and 28 are a pair of angle plates 30 and 31 having inwardly extending flanges positioned back to back. Riveted to opposite faces of these flanges are a pair of abutting channel bars 32 forming a bail to which may be connected the hook of an overhead crane. At the front and rear ends the rack is temporarily closed by means of detachable bars 33 which releasably fit into pockets 34 carried by the upper and lower frame bars 25 and 21. By removing the bars 33 the material may be easily removed from the rack. The construction of the portable platform B as well as the rack C may be substantially the same as described in my copending application Serial No. 83,947, filed January 26, 1926.

Referring to Figures 1 and 2 the portable platforms B are picked up successively by means of the electric truck T and carried on the lift platform L thereof into position to be deposited on the conveyer ways A. The load elevating truck T is preferably constructed in accordance with my copending application Serial No. 118,584, filed June 25, 1926. This truck in general comprises a lift or load elevating platform L which may be raised and lowered, and beneath the platform are mounted a plurality of pairs of dirigible load carrying wheels W, preferably eight in number. The lift platform L or L' is operated by power mechanism through an electric motor, and the driving wheels Y are also operated from an electric motor. By means of a common steering mechanism all ten wheels of the truck are turned about a common turning center. It will be noted that the ways A are spaced apart so as to permit the load carrying wheels W of the truck to be introduced therebetween enabling the truck to be propelled far enough between the ends of the conveyer ways so that the platform B may be deposited directly upon the ways. It will be understood that when the electric truck is introduced between the ways A as shown in Fig. 1, the lift platform L is elevated and carries the legs of the portable platform above the gravity rolls. The lift platform L is then lowered which lowers the portable platform B onto the gravity rolls. The truck is then backed out as shown in Fig. 2 and is propelled to such point where the empty platforms are located, picks up one of these platforms and returns and deposits it on the conveyer ways A.

At the opposite end of the conveyer ways the platform travels directly onto the load elevating or lift platform L' of a similar electric truck T. This is also accomplished by the fact that the load elevating wheels W beneath platform L' may travel between the exit end of the conveyer ways. With the lift platform L' in lowered position and projecting between the conveyer ways, each platform B travels its full length onto the lift platform. Thereupon the lift platform L' is elevated, which lifts the legs of the portable platform off the gravity rolls. The truck is then backed out from between the ways A, propelled with its load to a storage place, or another assembly line, or directly to the freight car loading dock, deposits the platform and load, and then returns for another platform and load.

The method illustrated in Figures 1 and 2 is particularly adapted for enabling different classes of material or parts, such as automobile parts, to be progressively assembled and packed in packing boxes or containers which may at the same time be constructed during the travel of the platforms over the conveyer ways. Thus when the platform is first deposited on the conveyer the operators or workmen at each side of the conveyer remove the necessary lumber from the platforms B' so as to build the bottom of the packing box or case. As the conveyer platform B moves forwardly other workmen take material from succeeding racks or platforms B' or C and gradually construct the sides and partitions 36 and 37 of the packing case, while at the same time during the travel of the platform, other workmen transfer parts or material from the various racks and platforms into the packing case while it is being constructed. Thus as the platform travels over the conveyer ways the packing box is gradually constructed and at the same time the different material or articles are progressively placed or assembled in the box, so that when the platform reaches the end of the conveyer it carries a complete loaded packing box, or a series of such boxes, depending upon the size thereof. Several boxes or cases may of course be constructed and packed on one platform during its travel. The trucks T' are successively brought into position at the exit end of the conveyer so as to lift the successive platforms directly from the conveyer ways and carry them away.

What I claim is:—

1. In a portable conveyer apparatus for industrial plants, the combination of parallel conveyer ways each comprising sections of antifriction surfaces, and a portable platform having legs spaced to travel on said ways, said ways having therebetween a supporting surface for a lift truck and above said surface an unobstructed area to permit the insertion therebetween and operation of the load elevating platform of a lift truck, the platform having a portion adapted to be engaged by a lift truck elevating platform, and when supported on said surfaces having said portion disposed at a height to be engaged and disengaged by said lifting platform in a horizontal plane intermediate the range of lift of the latter.

2. In a load handling apparatus the combination of a pair of parallel ways having antifriction surfaces, a truck having a lift platform and load carrying wheels beneath the platform adapted to travel into position between said ways, and a portable platform adapted to be carried on said lift platform and having legs spaced to travel on said antifriction surfaces.

3. In a conveyer the combination with a truck having load elevating and carrying mechanism of a pair of parallel ways supported on the plant floor to permit a load lifting truck to be propelled on the floor therebetween, and a portable platform having spaced supports adapted to travel on said ways and also adapted to straddle the truck lift mechanism when the truck is in position between the ways.

4. In a conveyer, the combination with a truck having load lifting and carrying mechanism of spaced parallel ways laid on the plant floor, a plurality of portable platforms each having a load supporting top and spaced depending legs adapted to travel on said ways, said legs and ways being constructed to form an unobstructed space therebetween for permitting the lift truck to be propelled thereinto and beneath the platform floor.

5. In a conveyer apparatus for industrial plants in combination, an assembly line comprising spaced parallel ways laid on the plant floor or ground, a series of portable platforms having depending legs cooperating with said ways, roller means interposed between said ways and the lower ends of said legs, said platforms being independent of said ways to permit the platforms at the end of their travel to be removed at the exit end of the ways and thereafter returned to the entrance end of the ways, said ways having therebetween at their ends a supporting surface for a lift truck whereby the same may be introduced between the ways and above said surface an unobstructed area whereby the lifting mechanism of the truck may be engaged with and disengaged from the platform.

6. In a conveyer apparatus for industrial plants in combination, an assembly line comprising spaced parallel ways laid on the plant floor or ground, a series of portable platforms having depending legs cooperating with said ways, said ways and legs being spaced to permit the introduction of a lift truck platform therebetween, roller means interposed between said ways and the lower ends of said legs, said platforms being independent of said ways to permit the platforms at the end of their travel to be removed at the exit end of the ways and thereafter returned to the entrance end of the ways, and said ways comprising means for guiding the platforms in a predetermined direction during their travel, said ways having at their ends therebetween a lift truck supporting surface and above said surface an unobstructed area whereby the lifting mechanism may be engaged with and disengaged from the portable platform spanning the ways.

7. In a material handling and conveying apparatus, the combination of a lift truck having a lift platform and load supporting wheels therebeneath, a pair of parallel ways spaced apart to permit the load wheels of the truck to travel between the ways, said ways comprising a series of anti-friction rollers of relatively small diameter, and a portable platform or platforms each having spaced legs capable of traveling on said ways and adapted to permit the lift platform of the truck to be introduced beneath the portable platform while the legs are resting on the ways.

8. In a material handling and conveying apparatus, the combination of a lift truck having a lift platform and load supporting wheels therebeneath, a pair of parallel ways spaced apart to permit the load wheels of the truck to travel between the ways, a portable platform or platforms each having longitudinally spaced legs at each side, and parallel runners connecting the pairs of legs and adapted to travel on said ways.

9. In a material handling and conveying apparatus, the combination of a series of portable platforms having spaced legs to permit the introduction of a lift truck platfrom herebetween to lift and carry the portable platforms, a pair of parallel ways upon which the legs of said portable platforms are adapted to travel, and a lift truck or trucks for carrying said portable platforms to or from the entrance or exit ends of said ways.

In testimony whereof I affix my signature.

ROBERT T. ROMINE.